3,396,098
ELECTRICAL DISCHARGE APPARATUS FOR OBTAINING HYDRAZINE FROM AMMONIA
Jean P. Manion, Milwaukee, Allen J. Hipp, Wauwatosa, and Daniel J. Davies, Milwaukee, Wis., assignors to Allis-Chalmers Manufacturing Company, Milwaukee, Wis.
Filed Dec. 21, 1965, Ser. No. 515,337
7 Claims. (Cl. 204—312)

This invention relates to an electrical discharge apparatus for the production of hydrazine from ammonia.

It is known to the art that when gaseous ammonia at reduced pressures is subjected to electrical excitation at voltages effecting glow discharge, a quantity of hydrazine is formed.

In the formation of hydrazine from ammonia by electrical discharge, hydrogen atoms and amino radicals are formed as transient intermediates. The amino radicals, i.e., $NH_2$, tend to combine one with the other to form hydrazine. The hydrogen atoms have a strong tendency to recombine with the amino radicals to reform ammonia and the greater the concentration of hydrogen atoms in the mixture, the greater will be the amount of ammonia reformed thereby reducing the yield of hydrazine obtained per unit of electrical power supplied. The yield of hydrazine produced in the electrical discharge is increased by utilizing a catalyst such as platinum or palladium metal for the recombination of hydrogen atoms to form molecular hydrogen which is then inactive towards recombination with amino radicals. However, hydrogen atoms are activated to recombine with one another and form molecular hydrogen by practically any solid surface on which they impinge, so that any solid material presenting a large amount of surface in the active region of the glow discharge is effective as a catalyst to improve the yield of hydrazine.

Prior art attempts to increase the surface area in the region of glow discharge which the discharge products contact include United States Patent No. 2,728,723, which discloses an electrical discharge apparatus for the production of hydrazine from ammonia wherein the ammonia is passed between spaced electrodes by means of a fluted tube. In United States Patent No. 2,849,357, ammonia gas is caused to flow substantially perpendicular to the longitudinal axis of permeable partitioned side walls of a glow discharge chamber. These prior art methods although successful, have not provided yields of hydrazine suitable for commercial practice.

In accordance with the present invention, improved yields of hydrazine are obtained from ammonia using an electrical glow discharge tube wherein a plurality of inert, nonconductive projections are extended out from the inner walls of the tube between the electrodes in the area of electrical discharge at an acute angle to the axis of flow of the ammonia gas passed into the tube, the arrangement of the projections are such as to cause a minimum departure from laminar gas flow thus offering a minimum of resistance to gas flow. The resultant extended path by which the ammonia gas is caused to flow in the region of the glow discharge in the apparatus of the present invention substantially increases the surface area which a unit volume of gas contacts in the region of the glow discharge. The combination of maximum surface and minimum residence time in the discharge region results in a substantial increase in the yield of hydrazine.

Figure 1:
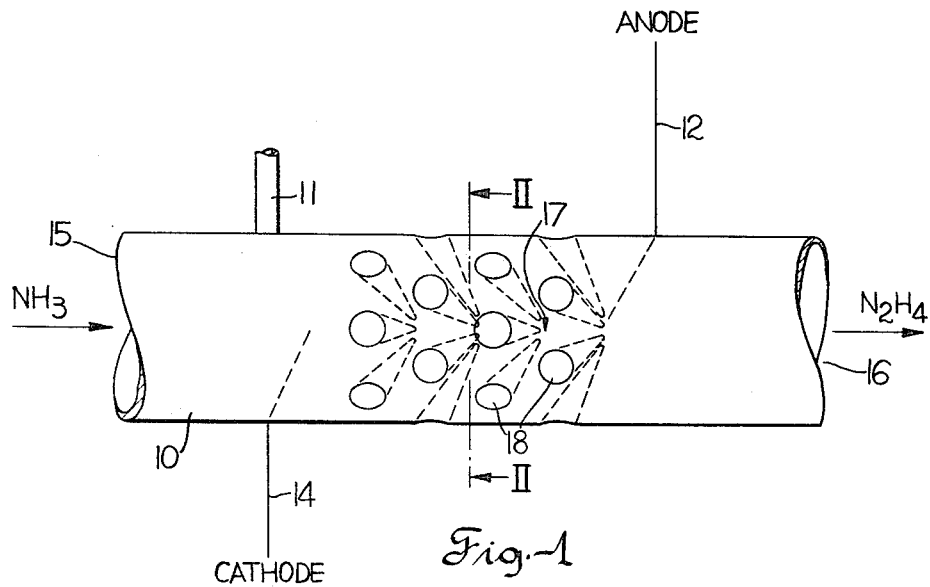
FIGURE 1 is a longitudinal side view of a section of the electrical discharge tube embodying the principles of the invention.
Figure 2:
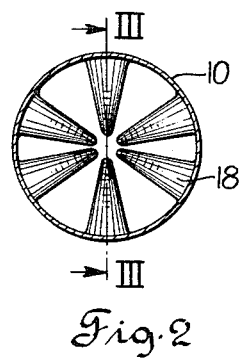
FIGURE 2 is a cross-sectional view of the tube shown in FIGURE 1 taken at line II—II.
Figure 3:
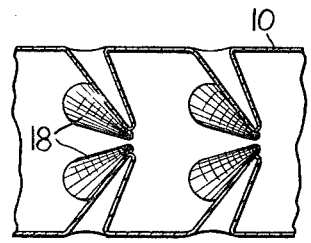
FIGURE 3 is a sectional side view taken at line III—III of FIGURE 2.

Referring to the drawing, the glow discharge apparatus of the present invention comprises cylindrical tube 10 composed of an electrically nonconductive material, advantageously glass, vycor, quartz or any suitable ceramic material provided with inlet and outlet ports 15 and 16, and port 11 adapted for the application of reduced pressure to the tube. Mounted in the tube 10 are a pair of discharge electrodes consisting of an anode 12 and a cathode 14. The electrodes are provided with suitable connections to a source of D.C. or A.C. potential. The ammonia gas is caused to flow by the electrodes in a direction substantially parallel to the longitudinal axis of the tube.

Any suitable material such as tantalum, tungsten, copper, silver, iron, platinum or the like may be used as an electrode material. Tungsten has been found particularly effective as an electrode material. It is preferred, however, that the cathode used in the electrical discharge apparatus be a low work function electrode.

A low work function electrode within the meaning of the present invention is any cathode having a photoelectric work function of about 2.5 electron volts or less. For example, alkaline earth metals, alkali metals and oxides thereof such as lithium, sodium, potassium, rubidium, cesium, barium, barium oxide, zirconium oxide, cesium oxide, strontium oxide are illustrative materials of which the surface of the low work function cathode may be comprised.

Extending angularly out from the walls of the tube 10 and disposed spirally along the walls of the tube 10 in the area of glow discharge 17 between the electrodes 12 and 14 are a plurality of inert, nonconducting projections 18, the projections 18 sloping in the direction of the flow of gas, the angle of slope of the projections 18 with the axis of gas flow being an acute angle of greater than 30° and preferably about 60°. The number of projections 18 spaced spirally in the glow discharge area 17 generally ranges from about 2.2 to about 3.1 projections per centimeter of circumference per centimeter of tube length. This number of projections sloping at an acute angle of more than 30° has been found to achieve high surface to volume ratio while permitting the relatively free flow of glass from the inlet 15 to the outlet 16 and resulting in no electrical discharge instability. The high surface to volume ratio achieved causes a substantial improvement in the yield of hydrazine when compared to glow discharge apparatuses of the prior art as will hereinafter be illustrated.

It is highly desirable that both the tube 10 and the projections 18 be electrical nonconductors. It has been found that the introduction of conducting surfaces into a plasma even though insulated from each other and from the electrodes results in large increases in discharge voltage with substantially no increase in the yield of hydrazine.

Advantageously, the projections 18 are made of the same material as the walls of the tube. If a glass tube is used as the glow discharge vessel, the projections 18 may be made by first heating the area of the tube where the projections are to be made to the softening point of the glass. The projections 18 are produced by the protrusion of a metal pick or like instrument into the softened side of the tube at the desired angle. Openings for the insertion of electrodes are then made in the tube and the tube is placed in an annealing oven to remove strains in the glass before placing it into discharge service.

It is also desirable as illustrated in the drawing that the electrodes 12 and 14 are disposed in the tube 10, as closely as possible to the projections 18, preferably with the cathode placed upstream from the projections 18 and with a 1.5 to 2.0 millimeter distance between the cathode surface 14 and the nearest projection.

In using the apparatus of the present invention to achieve optimum yields of hydrazine, it is desirable that the pressure of the ammonia in the glow discharge area 17 be between about 5 to 50 millimeters of mercury. At pressures much above 50 millimeters of mercury, energy yield falls off rapidly. To further achieve optimum results with the apparatus of the present invention, it is important that the interelectrode distance be between about 0.6 to 6.0 centimeters, the selection of the interelectrode distance within this range being dependent upon the ammonia pressure. To achieve optimum yields of hydrazine, the choice of interelectrode distance is inversely proportional to the ammonia pressure when employing the apparatus of the present invention.

The ammonia gas may be passed through the area of glow discharge 17 at any rate, preferably such that the linear rate is between about 9,000 to about 30,000 centimeters per second.

The amount of current employed to produce hydrazine with the apparatus of the present invention may vary from about 10 to about 100 milliamperes. At discharge currents substantially above 80 milliamperes, energy yield is disadvantageously affected. After passing through the area of glow discharge 17, the mixture of hydrazine and hydrogen thereby produced together with unreacted ammonia is pumped to a suitable recovery apparatus (not shown).

The principles of the invention are more particularly illustrated in the following examples.

EXAMPLE 1

Ammonia at varying pressures was passed through the inlet 15 of the tube 10 of the glow discharge apparatus of FIGURE 1 of the drawing at a linear flow rate of 9,000 cm./sec. The inside diameter of the glass tube was 2.4 cm. The anode 12 was composed of 0.025 inch diameter tungsten wire. The cathode consisted of a tungsten wire 0.025 inch in diameter around which was coiled a spiral of tungsten wire of about 0.002 inch diameter coated with a mixture of cesium oxide and strontium oxide which had a photoelectric work function of less than 2.5 electron volts. The interelectrode distance was varied from 0.6 to 9.2 centimeters. The discharge current was 10 milliamperes. The tapered projections 18, which were formed from the wall of the tube 10 in the area of glow discharge 17, extended from the walls of the tube at an angle of 60°±10° from the axis of ammonia gas flow from the inlet 15. The length of the tapered projections was about 6 to 8 mm. The diameter of the base of the projections was about 4±1 mm. and the diameter of the tip of the projections was about 1–1.5 mm. The number of projections encountered by the plasma-gas stream between electrodes varied from 2.2 projections per centimeter of circumference per centimeter of length, at the interelectrode distance of 2.4 centimeters, to 1.3 projections per centimeter of tube circumference per centimeter of length, at the interelectrode distance of 9.2 centimeters. The gaseous products issuing from the outlet 16 were collected in a cold trap cooled to −196° C. The yield of hydrazine in grams/kilowatt hour (kwh.) of electrical energy at the various ammonia pressures and interelectrode distances using the apparatus of the present invention are summarized in Table I below.

TABLE I

| Run No. | Interelectrode Distance (cm.) | $NH_3$ Pressure (mm. of Hg) | $N_2H_4$ Yield (g./kwh.) |
| --- | --- | --- | --- |
| 1 | 2.4 | 15 | 27.3 |
| 2 | 2.8 | 15 | 24.2 |
| 3 | 4.7 | 15 | 22.8 |
| 4 | 9.2 | 10 | 19.4 |

By way of contrast, hydrazine was prepared in a glow discharge apparatus of substantially the same dimensions, having the same electrodes and same ammonia flow rate as the apparatus of Example 1 with the exception that the apparatus employed did not have any angular projections in the area of glow discharge. Using this unmodified apparatus, with the interelectrode distance set at 3.2 centimeters and ammonia pressure at 5 millimeters of mercury and a discharge current of 11.5 milliamperes, the $N_2H_4$ yield was 13.0 g./kwh.

By way of further contrast, 8 nickel screens of 18 mesh and 0.012 inch wire diameter, 2.0 centimeter in diameter were cut to fit the internal diameter of the cell each coated with 4.0 mg. of palladium. The screens spaced 2 mm. apart by glass spacers was placed in the area of glow discharge of a glass tube having an internal diameter of 2.0 centimeters. The electrodes were similar to those employed in Example 1. Using this apparatus, with the interelectrode distance set at 5.0 centimeters, an ammonia pressure of 5.0 millimeters of mercury and a discharge current of 30 milliamperes the $N_2H_4$ yield was 4.7 g./kwh.

EXAMPLE 2

A glow discharge apparatus similar to that used in Example 1 was employed to prepare hydrazine from ammonia with the exception that the inside diameter of the tube was 1.7 cm. The tapered projections 18 which were formed from the walls of the tube 10 in the area of glow discharge 17 extended from the walls of the tube at an angle of 60°±10° from the axis of ammonia gas flow from the inlet 15. The number of projections encountered by the plasma-gas stream between electrodes was 2.6 projections per centimeter of tube circumference per centimeter of tube length. Discharge current was 10 milliamperes. Interelectrode distance and ammonia gas pressure was varied to illustrate the effect of these variables using an apparatus of the present invention. The yields of hydrazine are summarized in Table II below.

TABLE II

| Run No. | Interelectrode Distance (cm.) | $NH_3$ Pressure (mm. of Hg) | $N_2H_4$ Yield (g./kwh.) |
| --- | --- | --- | --- |
| 5 | 0.6 | 80 | 29.6 |
| 6 | 1.3 | 80 | 15.0 |
| 7 | 2.2 | 80 | 11.1 |
| 8 | 2.2 | 40 | 29.5 |
| 9 | 2.2 | 15 | 29.0 |
| 10 | 2.5 | 80 | 9.68 |

The embodiments of the invention in which an exclusive property or privilege is claimed are defined as follows:

1. An apparatus for producing hydrazine from gaseous ammonia in electrical glow discharges comprising an inert, nonconducting cylindrical tube, gas inlet means leading to said tube, product outlet means leading from said tube, means for subjecting tube to reduced pressure, a pair of electrode members disposed within said tube between said gas inlet means and product outlet means, said electrodes spaced one from another along the line of flow of the gas, means for maintaining an electrical potential between said electrode members, means for passing gaseous ammonia between said electrode members in a direction substantially parallel to the longitudinal axis of the tube, a plurality of inert, nonconducting projections extending from the walls of the tube disposed spirally between the electrode members and angularly to the line of flow of the gaseous ammonia and means for recovering the products of the electrical glow discharge.

2. The apparatus of claim 1 wherein the angle of slope of the projections to the axis of flow of the gaseous ammonia is an acute angle greater than 30°.

3. The apparatus of claim 1 wherein the angle of slope of the projections to the axis of flow of the gaseous ammonia ranges from 50 to 70°.

4. The apparatus of claim 1 wherein the number of projections per centimeter of tube circumference per centimeter of tube length between the electrode members ranges from about 2.2 to about 3.1.

5. The apparatus of claim 1 wherein the interelectrode distance between the electrode members ranges from about 0.6 to about 2.5 centimeters.

6. The apparatus of claim 1 wherein the cathode electrode surface is comprised of a low work function surface.

7. The apparatus of claim 1 wherein the cathode electrode surface is comprised of a mixture of cesium oxide and strontium oxide.

References Cited

UNITED STATES PATENTS

| | | | |
|---|---|---|---|
| 2,728,723 | 12/1955 | Akerlof | 204—177 |
| 2,849,356 | 8/1958 | Manion | 204—177 |
| 2,849,357 | 8/1958 | Devins | 204—177 |
| 3,003,939 | 10/1961 | Rouy et al. | 204—177 |
| 3,020,223 | 2/1962 | Manion | 204—177 |
| 3,152,056 | 10/1964 | Berghaus et al. | 204—177 |
| 3,272,730 | 9/1966 | Berghaus et al. | 204—177 |

ROBERT K. MIHALEK, *Primary Examiner.*